Patented Mar. 26, 1940

2,194,579

UNITED STATES PATENT OFFICE 2,194,579

PLASTIC COMPOSITION AND METHOD OF MOLDING THE SAME

Walter H. Wedger, Belmont, Mass., assignor to B. B. Chemical Co., Boston, Mass., a corporation of Massachusetts No Drawing. Application October 13, 1934, Serial No. 748,218

4 Claims. (Cl. 18—55)

This invention relates to the plastic arts, and more particularly to thermoplastic compositions and articles prepared therefrom.

An object of this invention is to provide improved plastic compositions which upon heating are pressure-responsive and may be readily formed into desired shape and which when cooled will retain the shape imparted thereto. Another object is to provide a thermoplastic composition which may be formed into articles which in the cold will exhibit properties of considerable strength, toughness and hardness.

In accordance with the above and other objects, I have discovered that thermoplastic compositions of highly advantageous character may be produced by associating together a polymerized haloprene, for example, polymerized chloroprene, and a polymerized vinyl ester of an aliphatic acid, for example, polymerized vinyl acetate, preferably in the proportions of 25 to 75 parts by weight of the former to 75 to 25 parts of the latter. Such compositions, when heated to a temperature somewhat below that of boiling water, for example, 70–90° C., soften to a condition in which they may be readily molded to a desired shape. Upon cooling again to room temperature, these compositons become tough, hard and resilient and maintain their molded shape. At room temperature these compositions are relatively hard, and when the proportion of polymerized vinyl acetate is upwards of 40%, they can barely be marked with the finger nail. Increase in the hardness of the product can be obtained by increasing the proportion of polymerized vinyl acetate. Articles wherein the polymerized chloroprene is in cured condition may be produced by incorporating suitable curing agents therein.

Specific examples of compositions prepared in accordance with this invention are as follows:

*Example I*

| | Parts by weight |
|---|---|
| Polymerized vinyl acetate | 25 |
| Polymerized chloroprene | 75 |

Softens at temperatures above 30° C.

*Example II*

| | Parts by weight |
|---|---|
| Polymerized vinyl acetate | 40 |
| Polymerized chloroprene | 60 |

Softens at temperatures above 40° C.

*Example III*

| | Parts by weight |
|---|---|
| Polymerized vinyl acetate | 50 |
| Polymerized chloroprene | 50 |

Softens at temperatures above 40° C.

*Example IV*

| | Parts by weight |
|---|---|
| Polymerized vinyl acetate | 60 |
| Polymerized chloroprene | 40 |

Softens at temperatures above 40° C.

*Example V*

| | Parts by weight |
|---|---|
| Polymerized vinyl acetate | 75 |
| Polymerized chloroprene | 25 |

Softens at temperatures above 40° C.

Compositions according to the above examples may be prepared on heated mills of the type ordinarily used in the rubber industry. Thus, the rolls of the mill may be heated by means of steam which, if desired, may be under greater than atmospheric pressure. Preferably the polymerized chloroprene is first milled until it has become fairly warm and plastic at which time the polymerized vinyl acetate, which is preferably in a fairly finely divided form, is fed to the material being compounded as it passes down through the rolls. The milling is continued until the ingredients have been thoroughly mixed to form a homogeneous composition. Under ordinary conditions it is preferable not to continue the milling any longer than necessary in order to avoid premature air vulcanizing or curing of the plastic polymerized chloroprene.

Where their presence is desired, other materials may be incorporated into the molding composition during the milling. Thus, paper or textile fibers, mineral fillers, pigments, or other coloring matter might be incorporated at this time.

Furthermore, when it is desired that the polymerized chloroprene be in cured or vulcanized condition in the finished article, this may be accomplished by milling into the composition sulphur and an accelerator in such proportions as to produce a slow curing at room temperature. For this purpose, about 3% sulphur and about 1% of an accelerator such as phenyl-beta-naphthylamine may be incorporated into the mix. In such case, about 5% wood rosin, 10% magnesium oxide, and 5% zinc oxide may also advantageously be incorporated. The above amounts are based upon the weight of polymerized chloroprene.

Under certain circumstances, it is desired to reinforce the molding composition with fabric. This may be accomplished by hot pressing the fabric against one or more sheets of the molding composition. Preferably the fabric is first impregnated with polymerized chloroprene, polymerized vinyl acetate, or with a mixture of both. The impregnation of the fabric with polymerized chloroprene may be carried out by applying a solution of polymerized chloroprene in benzol or other suitable solvent to the fabric and removing the solvent. The fabric might be impregnated with polymerized vinyl acetate by dissolving the polymer in an aromatic hydrocarbon and applying the solution to the fabric and removing the solvent.

Articles of manufacture may be prepared from compositions of this invention by taking advantage of the thermoplastic properties thereof. This composition may be heated to a temperature at which it is readily moldable, for example, by dipping the composition in hot water (for example 70–90° C.) and shaping the composition as desired while hot and plastic. This shaping may be accomplished manually, or by placing the composition in a suitable mold, or a matrix may be formed by impressing a die of suitable shape therein. The shaped article is then cooled to room temperature, preferably being maintained in the mold or held in the desired shape until the composition has cooled below its softening point.

An advantageous application of the composition herein disclosed is in the manufacture of forms or molds for use in shaping shoe bottoms. Such a mold or matrix is arranged to have its shoe-engaging face shaped to the contour which it is desired to impart to a shoe bottom and the mold is equally applicable whether the final shape is imparted to the sole as a part of a cement sole-attaching operation or whether the final shape is imparted to the sole as a separate operation after the sole has been previously secured to the shoe by means other than cement. Such a mold may be prepared by heating a sheet of the composition of this invention in any suitable manner to a temperature well above its softening point, such as by dipping the composition in hot water at a temperature of 70–90° C. The softened composition may then be placed between a shoe bottom and a fluid-filled or other suitable pad and pressure applied in order to impress the shoe bottom into the composition and impart thereto the shape of the shoe bottom. After the composition has been permitted to cool, the mold thus formed, which is hard, tough, and resilient at room temperature, may be employed in imparting to other shoe bottoms the shape of the matrix. The sheet of composition used for forming such molds may of course be reinforced with fabric material in the manner described hereinabove. The mode in which forms of this type may be employed in the shaping of shoe bottoms is disclosed in United States Letters Patent No. 2,024,154, granted December 17, 1935, upon an application filed in the name of Sidney J. Finn. For the purpose of preparing molds of the type above described I have found to be advantageous, compositions containing approximately equal proportions of polymerized chloroprene and polymerized vinyl acetate, or containing perhaps a slightly greater proportion of polymerized vinyl acetate.

Another commercial application of the compositions according to this invention is the preparation of box toes and counters for use in shoe manufacture. For this purpose compositions comprising polymerized chloroprene in greater proportion than polymerized vinyl acetate are preferable in order to provide material which is not too hard at room temperature and which is tough and strong. Thus, for example, compositions comprising 75 parts by weight of polymerized chloroprene to 25 parts by weight of polymerized vinyl acetate are suitable for this purpose. For the preparation of box toes and counters the composition may be rolled out into sheets of suitable thickness, with or without fabric reinforcement, and blanks died or otherwise cut out in any suitable manner. The blanks may then be heated to above the softening point of the composition, for example to 70–90° C., shaped while hot and then permitted to cool to room temperature, at which temperature the articles will retain the shape imparted to them.

It will thus be seen that by my invention I have provided a plastic material which may be readily prepared and which combines the advantageous features of being readily shaped and fabricated at conveniently attainable manufacturing temperature and yet which at room temperature exhibits highly advantageous mechanical properties of permanence, hardness and toughness.

A mode of preparation of polymerized vinyl acetate and other vinyl ester polymers suitable for use in connection with this invention is disclosed in United States Letters Patent No. 1,775,882, granted September 16, 1930, upon an application of C. O. Young and S. D. Douglas. Polymerized vinyl acetate suitable for the purposes of this invention is a normally solid material marketed under the commercial name "Vinylite A."

A form of polymerized haloprene suitable for the purposes of this invention is the synthetic rubber-like material known commercially as "Du Prene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. So far as applicable to the purposes of this invention, other haloprenes are to be considered as equivalents of chloroprene, for example, bromoprene, described in said Patent No. 1,950,431. The polymerization of bromoprene is described in United States Letters Patent No. 1,950,433, granted March 13, 1934, upon an application of W. H. Carothers and A. M. Collins.

Having described my invention, what I claim as new and desire to secure by Letters Patent of the United States is:

1. A thermoplastic molding composition, which at moderately high temperatures below the boiling point of water, is soft, pressure-responsive, and moldable to a predetermined shape and which, when cooled to room temperature, retains said predetermined shape and is strong, tough, and hard, said composition comprising a solid milled mixture of polymerized chloroprene and polymerized vinyl acetate in the proportions of 25 to 75 parts by weight of the former to about 75 to 25 parts by weight of the latter.

2. A thermoplastic molding composition comprising about equal parts by weight of plastic polymerized chloroprene and normally solid polymerized vinyl acetate milled together to form a homogeneous composition, said composition being characterized by its softness, pressure-responsiveness, and moldability to a predetermined shape at moderately high temperatures below the boiling point of water and by its strength, toughness, hardness and ability to retain a predetermined shape at room temperature.

3. An article of manufacture comprising about 25 to 75 parts by weight of polymerized chloroprene and about 75 to 25 parts by weight of normally solid polymerized vinyl acetate milled together to form a homogeneous composition and shaped to predetermined form, said article of manufacture being characterized by its strength, toughness, hardness and ability to retain a predetermined shape at room temperature.

4. The method of preparing a thermoplastic article of predetermined shape which comprises milling together plastic polymerized chloroprene and polymerized vinyl ester resin in the proportions of about 25 to 75 parts of chloroprene polymer to about 75 to 25 parts of vinyl resin, continuing said milling until said ingredients are thoroughly mixed to form a homogeneous composition, heating said composition to a temperature in the neighborhood of 70 to 90° C., pressing said heated composition against a matrix of the desired contour to impart the requisite shape to said composition, and cooling said composition and maintaining it in association with said matrix until said composition has cooled to a temperature below its softening point.

WALTER H. WEDGER.